(12) United States Patent
Miyahara et al.

(10) Patent No.: US 11,155,682 B2
(45) Date of Patent: Oct. 26, 2021

(54) CONTINUOUS DEHYDRATION METHOD AND METHOD FOR PRODUCING POLYARYLENE SULFIDE

(71) Applicant: Kureha Corporation, Tokyo (JP)

(72) Inventors: Michihisa Miyahara, Tokyo (JP); Kenji Suzuki, Tokyo (JP); Hiroshi Sakabe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 17/270,735

(22) PCT Filed: Jul. 12, 2019

(86) PCT No.: PCT/JP2019/027735
§ 371 (c)(1),
(2) Date: Feb. 23, 2021

(87) PCT Pub. No.: WO2020/044819
PCT Pub. Date: Mar. 5, 2020

(65) Prior Publication Data
US 2021/0198428 A1 Jul. 1, 2021

(30) Foreign Application Priority Data
Aug. 29, 2018 (JP) .............................. JP2018-160868

(51) Int. Cl.
*C08G 75/0254* (2016.01)
*C08G 75/0259* (2016.01)
(Continued)

(52) U.S. Cl.
CPC ..... *C08G 75/0259* (2013.01); *C08G 75/0254* (2013.01)

(58) Field of Classification Search
None
See application file for complete search history.

(56) References Cited

U.S. PATENT DOCUMENTS

| 4,064,114 A | 12/1977 | Edmonds, Jr. |
| 4,368,321 A | 1/1983 | Sherk et al. |
| (Continued) |

FOREIGN PATENT DOCUMENTS

| CN | 1292012 A | 4/2001 |
| CN | 1742037 A | 3/2006 |
| (Continued) |

OTHER PUBLICATIONS

English Translation of International Preliminary Report on Patentability for PCT/JP2019/027735, dated Mar. 2, 2021.
(Continued)

*Primary Examiner* — Tae H Yoon
(74) *Attorney, Agent, or Firm* — Birch, Stewart, Kolasch & Birch, LLP (57) ABSTRACT

The continuous dehydration method for a raw material mixture to be used in the production of PAS includes supply and dehydration of the raw material mixture and extraction of the raw material mixture having a water content reduced by the dehydration, the supply, dehydration and extraction being carried out concurrently in parallel. A dehydration efficiency index determined according to Equation (1) is not less than 0.3. In Equation (1), the dehydration time is a period of time until a moisture content per mole of the sulfur source in the raw material mixture having a reduced water content reaches not greater than 1.7 mol, including moisture consumed by the hydrolysis of the organic polar solvent.

$$\text{Dehydration efficiency index} = \frac{[\text{Number of moles (mol) of the sulfur source in the raw material mixture having a reduced water content}]}{[\text{Dehydration time (hr)} \times (\text{Total internal volume (L) of the dehydration tanks})^{2/3}]} \quad (1)$$

10 Claims, 2 Drawing Sheets

(51) Int. Cl.
*C08G 75/02* (2016.01)
*C08G 75/0281* (2016.01)

(56) References Cited

U.S. PATENT DOCUMENTS

| | | | |
|---|---|---|---|
| 4,500,702 | A | 2/1985 | Ostlinning et al. |
| 4,595,748 | A | 6/1986 | Ostlinning et al. |
| 5,194,580 | A | 3/1993 | Koyama et al. |
| 5,239,050 | A | 8/1993 | Ash |
| 5,840,830 | A | 11/1998 | Miyahara et al. |
| 6,538,102 | B1 | 3/2003 | Haubs et al. |
| 7,504,476 | B2 | 3/2009 | Kawama et al. |
| 7,517,946 | B2 * | 4/2009 | Sato .............. C08G 75/0254 528/381 |
| 10,072,123 | B2 | 9/2018 | Konno et al. |
| 10,604,630 | B2 | 3/2020 | Miyahara et al. |
| 2005/0228095 | A1 | 10/2005 | Onishi et al. |
| 2006/0074219 | A1 | 4/2006 | Kawama et al. |
| 2017/0029570 | A1 | 2/2017 | Kobayashi et al. |
| 2017/0137573 | A1 | 5/2017 | Suzuki et al. |
| 2017/0362387 | A1 | 12/2017 | Konno et al. |
| 2018/0244848 | A1 | 8/2018 | Mokudai et al. |
| 2018/0298145 | A1 | 10/2018 | Suzuki et al. |

FOREIGN PATENT DOCUMENTS

| | | |
|---|---|---|
| CN | 106164133 A | 11/2016 |
| CN | 107108893 A | 8/2017 |
| CN | 107922619 A | 4/2018 |
| CN | 108026275 A | 5/2018 |
| CN | 109071815 A | 12/2018 |
| EP | 353716 A2 | 2/1990 |
| EP | 513730 A2 | 11/1992 |
| EP | 792904 A2 | 9/1997 |
| EP | 1058706 A1 | 12/2000 |
| EP | 1586601 A1 | 10/2005 |
| GB | 1056226 A | 1/1967 |
| JP | 51-144496 A | 12/1976 |
| JP | 58-42623 A | 3/1983 |
| JP | 59-105027 A | 6/1984 |
| JP | 60-104130 A | 6/1985 |
| JP | 63-264633 A | 11/1988 |
| JP | 2-45531 A | 2/1990 |
| JP | 4-345620 A | 12/1992 |
| JP | 07-173290 A | 7/1995 |
| JP | 8-231722 A | 9/1996 |
| JP | 9-286861 A | 11/1997 |
| JP | 2002-505361 A | 2/2002 |
| JP | 2004-244619 A | 9/2004 |
| JP | 2005-298669 A | 10/2005 |
| JP | 2012-188625 A | 10/2012 |
| JP | 2017-210560 A | 11/2017 |
| KR | 10-1993-0004610 B | 6/1993 |
| KR | 10-2001-0041648 A | 5/2001 |
| KR | 10-2005-0092769 A | 9/2005 |
| KR | 10-2016-0110548 A | 9/2016 |
| KR | 10-2017-0093935 A | 8/2017 |
| KR | 10-2018-0114245 A | 10/2018 |
| WO | 1999/045057 A1 | 9/1999 |
| WO | 2016/108270 A1 | 7/2016 |
| WO | 2018/135372 A1 | 7/2018 |

OTHER PUBLICATIONS

Chinese Office Action and Search Report for Chinese Application No. 201980050028.7, dated Apr. 23, 2021, with an English translation.
Korean Office Action for Korean Application No. 10-2021-7008628, dated Apr. 23, 2021, with an English translation.

* cited by examiner

CONTINUOUS DEHYDRATION METHOD AND METHOD FOR PRODUCING POLYARYLENE SULFIDE

CROSS REFERENCE TO RELATED APPLICATIONS

This application is the National Phase of PCT International Application No. PCT/JP2019/027735, filed on Jul. 12, 2019, which claims priority under 35 U.S.C. 119(a) to Patent Application No. 2018-160868, filed in Japan on Aug. 29, 2018, all of which are hereby expressly incorporated by reference into the present application.

TECHNICAL FIELD

The present invention relates to a continuous dehydration method for a raw material mixture to be used in the production of polyarylene sulfide, and a method for producing polyarylene sulfide using the continuous dehydration method.

BACKGROUND ART

In the production of polyarylene sulfide (hereafter sometimes abbreviated as "PAS"), water is contained in a sulfur source and the like as raw materials, and, therefore, it is necessary to dehydrate the raw materials before polymerization of PAS. For example, Patent Documents 1 to 7 disclose a batch dehydration method in which the raw materials are dehydrated at normal pressure or under pressure in a polymerization vessel in a batch manner.

CITATION LIST

Patent Document

Patent Document 1: JP 45-3368 B
Patent Document 2: JP 51-144496 A
Patent Document 3: JP 58-42623 A
Patent Document 4: JP 59-105027 A
Patent Document 5: JP 60-104130 A
Patent Document 6: JP 7-173290 A
Patent Document 7: JP 2002-505361 T

SUMMARY OF INVENTION

Technical Problem

However, the batch dehydration methods as described above involve the problems that dehydration in a short period of time causes foaming and thus clogging of a nozzle and overflow to a dehydration column. A dehydration step for a long period of time is required to suppress the occurrence of foaming in the batch dehydration method. Alternatively, a margin is given to the height of a dehydration tank, thereby making it possible to prevent clogging of the nozzle and overflow to the dehydration column, due to foaming. However, the volume of the dehydration tank must be increased.

Therefore, an object of the present invention is to provide a continuous dehydration method for a raw material mixture to be used in the production of PAS, which can suppress the occurrence of foaming and overflow and enables dehydration in a short period of time.

Solution to Problem

As a result of diligent research to solve the problems described above, the present inventors have made the present invention based on the findings that the supply of a raw material mixture to be used in the production of PAS, the dehydration of the raw material mixture, and the extraction of the raw material mixture having a water content reduced by the dehydration are continuously carried out, and thus the occurrence of rapid foaming and overflow can be suppressed and the raw material mixture can be dehydrated in a short period of time.

That is, the present invention relates to a continuous dehydration method for a raw material mixture to be used in the production of polyarylene sulfide, which is carried out prior to the production of polyarylene sulfide, the method including:
a supply step of continuously supplying a sulfur source and an organic polar solvent that constitute the raw material mixture to a continuous dehydration apparatus having one or more dehydration tanks;
a dehydration step of continuously removing water from the raw material mixture; and an extraction step of continuously extracting the raw material mixture having a reduced water content from the continuous dehydration apparatus,
the steps being carried out concurrently in parallel,
wherein a temperature of the dehydration tank supplied with the sulfur source and the organic polar solvent in the continuous dehydration apparatus ranges from 110° C. to 270° C.; and
a dehydration efficiency index determined according to the following Equation (1) is not less than 0.3:

$$\text{Dehydration efficiency index} = [\text{Number of moles (mol) of the sulfur source in the raw material mixture having a reduced water content}]/[\text{Dehydration time (hr)} \times (\text{Total internal volume (L) of the dehydration tanks})^{2/3}] \quad (1)$$

In Equation (1), the dehydration time is a period of time until a moisture content per mole of the sulfur source in the raw material mixture having a reduced water content reaches not greater than 1.7 mol, including moisture consumed by the hydrolysis of the organic polar solvent.

Advantageous Effects of Invention

The continuous dehydration method of the present invention makes it possible to suppress the occurrence of rapid foaming and overflow and to dehydrate the raw material mixture to be used in the production of polyarylene sulfide in a short period of time.

DESCRIPTION OF EMBODIMENTS

Although embodiments of the present invention will be described hereinafter, the present invention is not limited to the following specific embodiments and can arbitrarily be modified within the technical scope of the present invention.

The continuous dehydration method according to the present embodiment is a continuous dehydration method for a raw material mixture to be used in the production of polyarylene sulfide, which is carried out prior to the production of polyarylene sulfide, the method including:

continuously supplying a sulfur source and an organic polar solvent that constitute the raw material mixture to a continuous dehydration apparatus;

continuously removing water from the raw material mixture; and continuously extracting the raw material mixture having a reduced water content from the continuous dehydration apparatus, the steps being carried out concurrently in parallel.

An example of the continuous dehydration apparatus which is suitably used for implementing the continuous dehydration method of the present embodiment will be described prior to detailed description of the continuous dehydration method of the present embodiment. Note that the continuous dehydration method of the present embodiment is not limited to those in which the continuous dehydration apparatus described below is used.

[Continuous Dehydration Apparatus]

Figure 1:
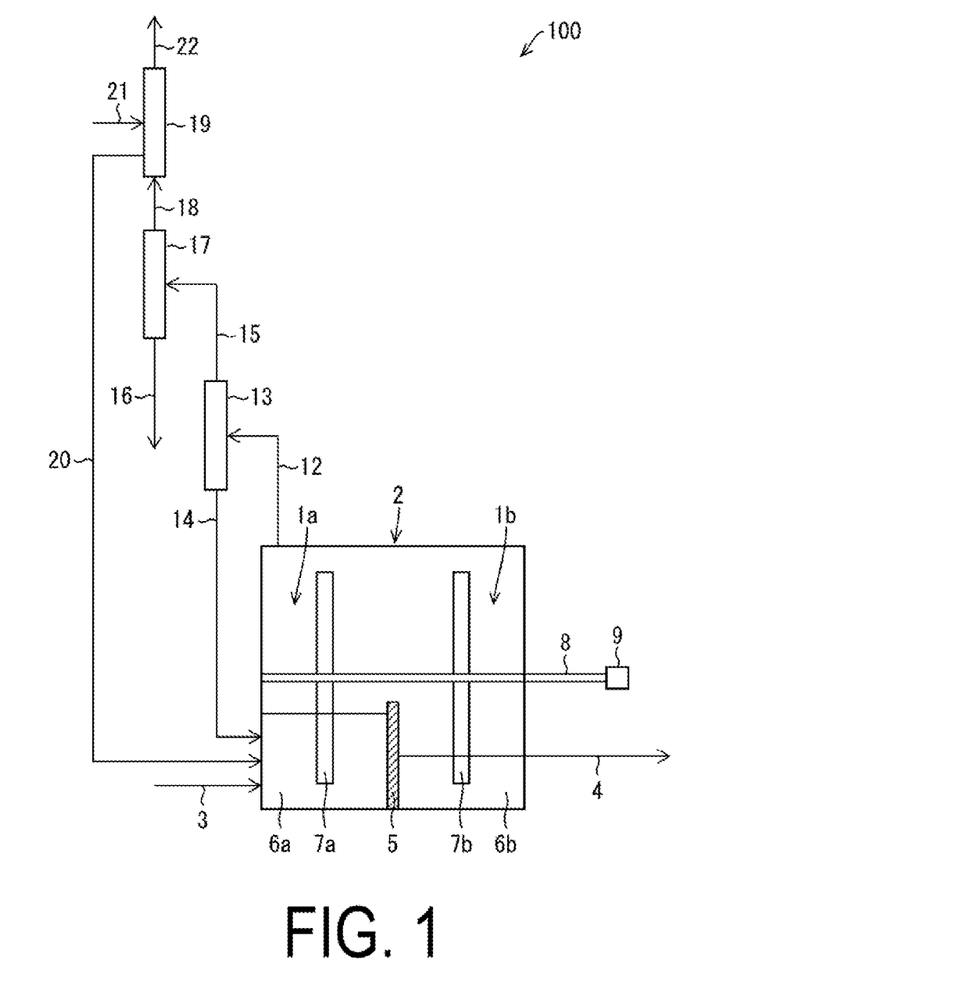
FIG. 1 is a partial cross-sectional view illustrating an embodiment of a continuous dehydration apparatus used in a continuous dehydration method according to the present embodiment.
Figure 2:
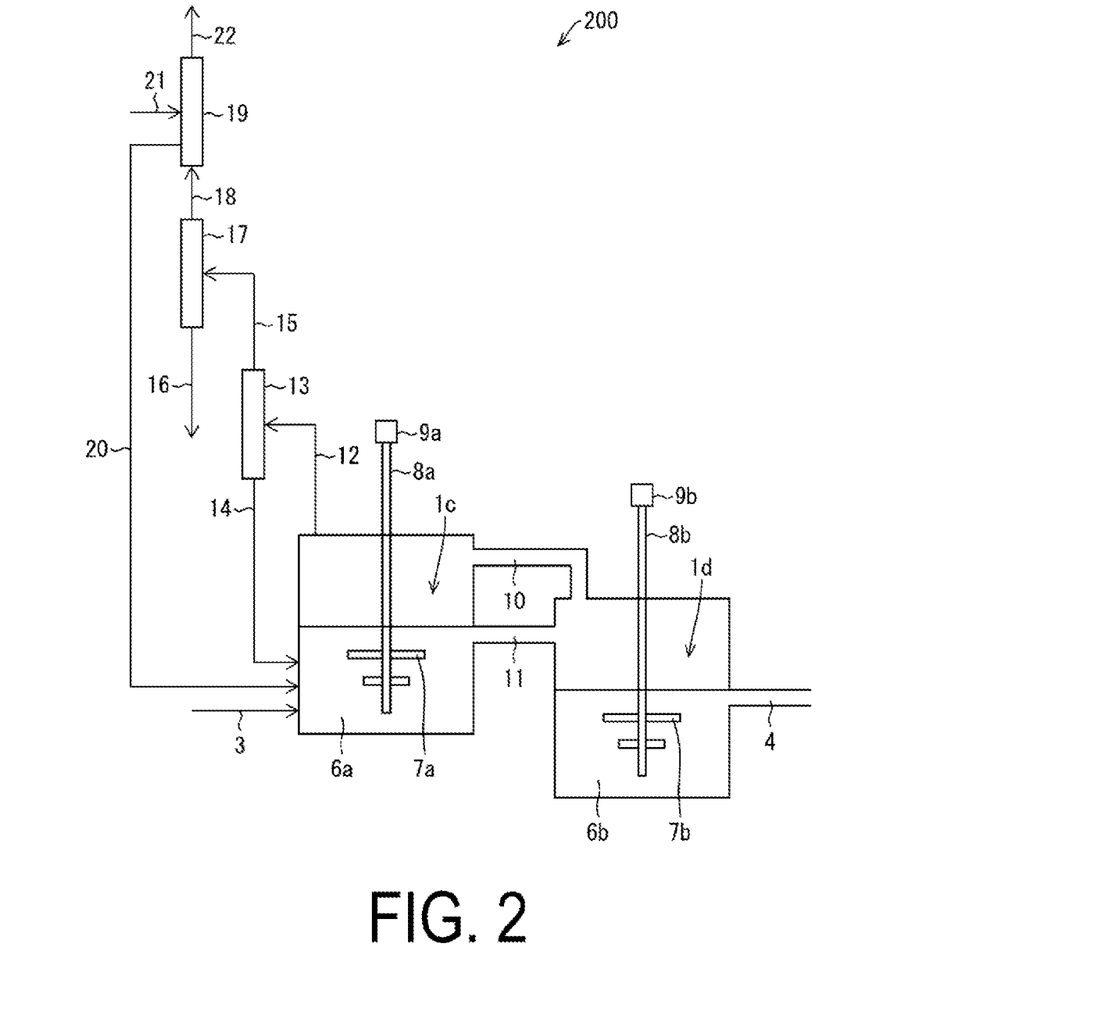
FIG. 2 is a partial cross-sectional view illustrating another embodiment of the continuous dehydration apparatus used in the continuous dehydration method according to the present embodiment.

In the implementation of the continuous dehydration method according to the present embodiment, for example, a continuous dehydration apparatus illustrated in FIG. 1 or 2 can be used. Each of the continuous dehydration apparatuses will be described below.

[First Aspect of Continuous Dehydration Apparatus]

A first aspect of the continuous dehydration apparatus will be described with reference to FIG. 1. FIG. 1 is a diagram illustrating a schematic configuration of the continuous dehydration apparatus according to the first aspect.

As illustrated in FIG. 1, a continuous dehydration apparatus 100 includes a dehydration chamber 2; a raw material supply line 3 connected to the dehydration chamber 2; a raw material mixture extraction line 4 connected to the dehydration chamber 2 and extracting a raw material mixture having a reduced water content; a first gas-liquid separation unit 13 and a second gas-liquid separation unit 17 connected to the dehydration chamber 2 via an exhaust line 12; and a sulfur source recovery unit 19 recovering a sulfur source contained in a gas from the second gas-liquid separation unit 17.

<Dehydration Chamber>

The dehydration chamber 2 is a cylindrical tank extending from a raw material supply side toward a side on which the raw material mixture having a reduced water content is extracted. The inside of the dehydration chamber 2 is divided into two dehydration tanks 1a and 1b, from the raw material supply side toward the side on which the raw material mixture having a reduced water content is extracted. The dehydration tanks 1a and 1b are separated by a partition wall 5 so as to communicate with each other via a gas phase. The raw material supply line 3 supplied with the raw materials is connected to the dehydration tank 1a side of the dehydration chamber 2. In addition, the raw material mixture extraction line 4 that extracts the raw material mixture having a reduced water content is connected to the dehydration tank 1b side of the dehydration chamber 2. The raw materials to be subjected to dehydration treatment are supplied through the raw material supply line 3 to the dehydration tank 1a, and the raw material mixture in the dehydration tank 1a moves over the partition wall 5 to the dehydration tank 1b. The raw material mixture in the dehydration tank 1b is then extracted through the raw material mixture extraction line 4 to the outside of the dehydration chamber 2. The "raw material mixture" in the present specification is a mixture of a sulfur source and an organic polar solvent that are subjected to the dehydration treatment. When the sulfur source and the organic polar solvent are supplied separately, a raw material mixture is formed in the dehydration tank. The mixture may also be supplied in a premixed state as will be described below. For example, any other polymerization auxiliary agent or the like may also be contained in the raw material mixture, and the details thereof will be described below.

The dehydration tank is preferably made of a material that is resistant to high temperatures and corrosion, and examples of the material include a metal material such as titanium, zirconium or nickel, or an alloy containing these metal material as the main component (such as Hastelloy or Inconel); and stainless steel. From the perspective of resource saving, cost reduction, ease of processing, and the like, it is more preferable that the dehydration tank is made of stainless steel. Examples of stainless steel include SUS304 and SUS316.

A temperature control device (not illustrated) may be provided in the dehydration chamber 2 so that the temperatures of the dehydration tank 1a and the dehydration tank 1b can be controlled independently.

The dehydration tanks 1a and 1b communicate with each other via the gas phase. As a result, the pressure of the gas phase in the dehydration chamber 2 is uniform. Water is thereby removed from both of the dehydration tanks 1a and 1b in a similar manner. Therefore, the amount of water in the dehydrated mixture can be decreased from the dehydration tank 1a toward the dehydration tank 1b, that is, from the upstream side toward the downstream side in the movement direction of the dehydrated mixture. Furthermore, as the amount of water decreases, the boiling point of the dehydrated mixture increases. Thus, the temperature of the dehydration tanks can be increased from the upstream side toward the downstream side in the movement direction of the dehydrated mixture, and dehydration can further be accelerated.

In the dehydration chamber 2, a stirring blade 7a that stirs a raw material mixture 6a in the dehydration tank 1a, and a stirring blade 7b that stirs a raw material mixture 6b in the dehydration tank 1b are disposed, in common, on a stirring shaft 8. The stirring shaft 8 is installed in such a manner as to penetrate the dehydration chamber 2. A rotary driving device 9 that rotates the stirring shaft 8 is installed on an end, on the dehydration tank 1b side, of the stirring shaft 8.

The shape of the dehydration chamber 2 is not particularly limited, and can appropriately be selected depending on the purpose.

<Raw Material Supply Line>

The raw material supply line 3 is a line for supplying the raw materials for PAS, which are to be subjected to the dehydration treatment, to the dehydration chamber 2. The "raw materials for PAS" in the present specification are intended to include an aromatic compound and a solvent necessary for polymerization of PAS in addition to the sulfur source serving as a component of PAS.

The raw material supply line 3 may be provided such that the raw materials for PAS are supplied to a liquid phase in the dehydration tank 1a via the gas phase, or may be provided directly to the liquid phase in the dehydration tank 1a. When a supply port of the raw material supply line 3 is provided at a position higher than the height of the partition wall 5 in the dehydration chamber 2, the raw material is supplied via the gas phase. When the supply port of the raw material supply line 3 is provided at a position lower than the height of the partition wall 5 in the dehydration chamber 2, the raw material is supplied directly to the liquid phase.

Although only one raw material supply line 3 is illustrated in FIG. 1, different lines may be provided for the sulfur source and the organic polar solvent, which are the raw materials to be supplied. Note that the raw materials to be subjected to the dehydration treatment may be supplied in a premixed state, and, in this case, one raw material supply line 3 may be provided.

<Raw Material Mixture Extraction Line>

The raw material mixture extraction line 4 is a line for extracting the raw material mixture having a reduced water content after the dehydration from the dehydration chamber 2. In order to prevent backflow of the raw material mixture after the dehydration from the dehydration tank 1b to the dehydration tank 1a, the raw material mixture extraction line 4 is connected to the dehydration tank 1b at a position lower than the height of the partition wall 5.

<First Gas-Liquid Separation Unit>

The first gas-liquid separation unit 13 is a device for condensing the organic polar solvent from exhaust gas from the gas phase of the dehydration chamber 2, and resupplying the organic polar solvent to the dehydration chamber 2. The first gas-liquid separation unit 13 is connected to the dehydration chamber 2 through an exhaust line 12. A known distillation column or the like can be used as the first gas-liquid separation unit 13. An organic polar solvent resupply line 14 for resupplying the liquid organic polar solvent produced by gas-liquid separation to the dehydration chamber 2, and a first gas recovery line 15 for recovering the residual gas are connected to the first gas-liquid separation unit 13.

<Second Gas-Liquid Separation Unit>

The second gas-liquid separation unit 17 is a device for feeding the residual gas from the gas phase of the first gas recovery line 15 to a sulfur source recovery unit 19, and condensing water and discarding it through a waste water line 16. The second gas-liquid separation unit 17 is connected to the first gas-liquid separation unit 13 through the first gas recovery line 15, and the other end thereof is connected to the sulfur source recovery unit 19. A known condenser or the like can be used as the second gas-liquid separation unit 17. The waste water line 16 for discarding water produced by gas-liquid separation, and a second gas recovery line 18 for feeding the residual gas to the sulfur source recovery unit are connected to the second gas-liquid separation unit 17.

<Sulfur Source Recovery Unit>

The other end of the second gas recovery line 18 is connected to the sulfur source recovery unit 19. In addition, a sulfur source absorbent supply line 21 that supplies a sulfur source absorbent, such as sodium hydroxide, from one end (for example, an upper portion) of the sulfur source recovery unit 19. In the sulfur source recovery unit 19, the sulfur source recovered through the second gas recovery line 18 is absorbed by the sulfur source absorbent supplied through the sulfur source absorbent supply line 21. The sulfur source absorbent that has absorbed the sulfur source is supplied to the dehydration tank 1a through a sulfur source resupply line 20. The unabsorbed gas is discharged through a waste gas line 22.

The configuration described above makes it possible to continuously supply the raw materials for PAS to be subjected to the dehydration treatment to the dehydration chamber 2, to continuously remove water from the raw material mixture, to continuously extract the raw material mixture having a reduced water content from the dehydration chamber 2, and to carry out these steps concurrently in parallel, in the continuous dehydration apparatus 100.

(Modified Example of Continuous Dehydration Apparatus 100)

The dehydration chamber 2 is divided into two dehydration tanks in the continuous dehydration apparatus 100 described above, but may only have one or more dehydration tanks. For example, the dehydration chamber 2 may be divided into three or more dehydration tanks, or may not be divided into two or more dehydration tanks and may include only one dehydration tank. The dehydration chamber 2 preferably has a plurality of dehydration tanks in order to suppress the occurrence of foaming and overflow and to perform dehydration in a short period of time. It is also necessary that the plurality of dehydration tanks be sequentially connected and designed so that the raw material mixture sequentially moves to the respective dehydration tanks. For example, in a case where the dehydration chamber 2 is divided into three or more dehydration tanks, the partition walls partitioning the respective dehydration tanks are preferably designed so that their heights are sequentially lowered from the raw material supply side toward the side on which the raw material mixture having a reduced water content is extracted, and the liquid surfaces of the respective dehydration tanks sequentially decrease in height. The phrase "sequentially connected" as used herein means that the plurality of dehydration tanks are preferably all connected in series, but they may be connected partially in parallel.

Further, the dehydration chamber 2 may be installed to be inclined, in the continuous dehydration apparatus 100. When the dehydration chamber 2 is installed to be inclined, the dehydration tank 1a to which the raw material supply line 3 is connected is higher, in terms of the maximum liquid level of the liquid that can be housed, than the dehydration tank 1b to which the raw material mixture extraction line 4 is connected. In the dehydration tanks except for the dehydration tank 1a at the uppermost stream in the movement direction of the raw material mixture, the minimum height of the partition wall on the upstream side in the movement direction is higher than the maximum liquid level of the dehydration tank. That is, in the dehydration tank 1b, the minimum height of the partition wall 5 on the upstream side in the movement direction is higher than the maximum liquid level of the dehydration tank 1b. This prevents backflow from the dehydration tank 1b to the dehydration tank 1a. The dehydration tanks 1a and 1b can respectively house the raw material mixture 6a and the raw material mixture 6b.

[Second Aspect of Continuous Dehydration Apparatus]

Next, a second aspect of the continuous dehydration apparatus will be described with reference to FIG. 2. FIG. 2 is a diagram illustrating a schematic configuration of the continuous dehydration apparatus according to the second aspect. Members having the same functions as those described in the above embodiment are denoted by the same reference numerals, and description thereof will not be repeated.

As illustrated in FIG. 2, a continuous dehydration apparatus 200 includes: dehydration tanks 1c and 1d coupled to each other via a gas phase communication portion 10 and a raw material mixture communication portion 11; a raw material supply line 3 connected to the dehydration tank 1c; a raw material mixture extraction line 4 connected to the dehydration tank 1d; a first gas-liquid separation unit 13 connected to the dehydration tank 1c through an exhaust line 12; a second gas-liquid separation unit 17; and a sulfur source recovery unit 19.

The dehydration tanks 1c and 1d are each independently present, and the dehydration tanks communicate with each other via the gas phase communication portion 10 and the raw material mixture communication portion 11.

The raw material to be subjected to dehydration treatment is supplied to the dehydration tank 1c through the raw material supply line 3, and the raw material mixture communication portion 11 is provided so that, when a raw material mixture in the dehydration tank 1c exceeds a height at which the raw material mixture communication portion 11 is installed, the raw material mixture moves to the dehydration tank 1d through the raw material mixture communication portion 11. The raw material mixture in the dehydration tank 1d is then extracted through the raw material mixture extraction line 4 to the outside of the continuous dehydration apparatus 200. Thus, in the continuous dehydration apparatus 200, the raw material mixture can be sequentially moved from the dehydration tank located above to the dehydration tank located below, due to the difference in height between the dehydration tanks. This configuration allows the raw material mixture to move due to gravity and the difference in height between the dehydration tanks. Thus, it is unnecessary to provide a separate means for moving the raw material mixture to the next dehydration tank.

The dehydration tank 1d is disposed in the vertical direction below the dehydration tank 1c.

Stirring shafts (8a, 8b) including stirring blades (7a, 7b) are provided in the dehydration tanks 1c and 1d, respectively. Rotary driving devices (9a, 9b) are attached to the stirring shafts, respectively.

The exhaust line 12 that leads to the first gas-liquid separation unit 13 is connected to the dehydration tank 1c. However, since the dehydration tanks 1c and 1d communicate with each other via the gas phase communication portion 10, the pressures of the gas phases in the dehydration tanks 1c and 1d are uniform.

The configuration described above makes it possible to continuously supply the raw materials for PAS to be subjected to the dehydration treatment to the continuous dehydration apparatus 200, to continuously remove water from the raw material mixture, to continuously extract the raw material mixture having a reduced water content from the continuous dehydration apparatus 200, and to carry out these steps concurrently in parallel, also in the continuous dehydration apparatus 200.

[Continuous Dehydration Method]

Next, the continuous dehydration method of the present embodiment will be described in detail.

The continuous dehydration method of the present embodiment includes: a supply step of continuously supplying a sulfur source and an organic polar solvent that constitute a raw material mixture to a continuous dehydration apparatus having one or more dehydration tanks; a dehydration step of continuously removing water from the raw material mixture; and an extraction step of continuously extracting the raw material mixture having a reduced water content from the continuous dehydration apparatus, the steps being carried out concurrently in parallel. In addition, a temperature of the dehydration tank supplied with the sulfur source and the organic polar solvent in the continuous dehydration apparatus ranges from 110° C. to 270° C., and a dehydration efficiency index determined according to the following Equation (1) is not less than 0.3:

Dehydration efficiency index=[Number of moles (mol) of the sulfur source in the raw material mixture having a reduced water content]/[Dehydration time (hr)×(Total internal volume (L) of the dehydration tanks)$^{2/3}$]  (1)

wherein the dehydration time is a period of time until a moisture content per mole of the sulfur source in the raw material mixture having a reduced water content reaches not greater than 1.7 mol, including moisture consumed by the hydrolysis of the organic polar solvent.

(Supply Step)

In the supply step, the sulfur source and organic polar solvent constituting the raw material mixture are continuously supplied to the continuous dehydration apparatus having one or more dehydration tanks. The phrase "continuously supplying" as used herein means that all of the sulfur source and organic polar solvent that are subjected to dehydration continue to be supplied for a certain period of time, unlike a batch dehydration method in which they are supplied at once. It is preferable that the sulfur source and organic polar solvent that constitute the raw material mixture continue to be supplied at a constant flow rate, for example, from the perspective that rapid foaming can be suppressed sufficiently.

<Sulfur Source>

At least one type of sulfur source selected from the group consisting of hydrogen sulfide, alkali metal sulfides and alkali metal hydrosulfides is used as the sulfur source. Note that, when an alkali metal hydrosulfide and hydrogen sulfide are used, an alkali metal hydroxide is used together with the sulfur source. Therefore, more water may be generated. Therefore, when an alkali metal hydrosulfide and hydrogen sulfide are used as the sulfur source, the continuous dehydration method of the present embodiment having an excellent dehydration efficiency is suitably used.

The sulfur source can be handled, for example, in a state of an aqueous slurry or an aqueous solution, and is preferably in a state of an aqueous solution from the perspective of handleability such as measurability and transportability.

Examples of the alkali metal sulfides include lithium sulfide, sodium sulfide, potassium sulfide, rubidium sulfide, and cesium sulfide.

Examples of the alkali metal hydrosulfides include lithium hydrosulfide, sodium hydrosulfide, potassium hydrosulfide, rubidium hydrosulfide, and cesium hydrosulfide.

<Organic Polar Solvent>

Examples of the organic polar solvent include N,N-dialkylformamide compounds or N,N-dialkylacetamide compounds, such as N,N-dimethylformamide and N,N-dimethylacetamide; caprolactam compounds or N-alkylcaprolactam compounds, such as ε-caprolactam and N-methyl-ε-caprolactam; pyrrolidone compounds, N-alkylpyrrolidone compounds or N-cycloalkylpyrrolidone compounds, such as 2-pyrrolidone, N-methyl-2-pyrrolidone (NMP), N-ethyl-2-pyrrolidone, and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphate triamide compounds, such as hexamethyl phosphate triamide. The organic polar solvent is preferably an amide compound, a caprolactam compound, a pyrrolidone compound or an imidazolidinone compound, more preferably an N-alkylpyrrolidone compound or an N-cycloalkylpyrrolidone compound, and even more preferably N-methyl-2-pyrrolidone (NMP), from the perspective that the material can accelerate the polymerization reaction.

With regard to the concentration of the sulfur source to be supplied in the supply step, the total supply amount thereof in terms of sulfur atoms is preferably from 0.05 to 1 mol, more preferably from 0.1 to 0.7 mol, and even more preferably from 0.2 to 0.6 mol, per 100 g of the solvent.

The temperature of the dehydration tank (for example, the dehydration tank 1a in FIG. 1) to which the sulfur source and the organic polar solvent are supplied is sufficiently from 110° C. to 270° C., preferably from 140° C. to 250° C., and more preferably from 150° C. to 235° C. When a plurality of the dehydration tanks are provided, the temperatures of the dehydration tanks other than the dehydration tank to which the sulfur source and the organic polar solvent are supplied are sufficiently from 140° C. to 270° C., preferably from 150° C. to 260° C., and more preferably from 180° C. to 240° C.

<Polymerization Auxiliary Agent>

In the supply step, a polymerization auxiliary agent for polyarylene sulfide may further be supplied. The polymerization auxiliary agent is preferably an aqueous polymerization auxiliary agent or a polymerization auxiliary agent containing water in terms of handleability in the polymerization of PAS and availability. On the other hand, since the presence of water inhibits polymerization of PAS, water associated with the polymerization auxiliary agent is preferably dehydrated together with the raw material mixture.

Specific examples of such polymerization auxiliary agents include organic carboxylates, organic sulfonates, alkali metal sulfates, alkaline earth metal oxides, alkali metal phosphates, and alkaline earth metal phosphates. Among these materials, sodium salts, potassium salts or lithium salts of C2-C12 organic carboxylic acids are preferably used. More specifically, sodium salts, potassium salts, or lithium salts of short chain fatty acids or aromatic carboxylic acids are exemplified. Among these materials, sodium salts, potassium salts, or lithium salts of acetic acid, propionic acid, isobutyric acid, butyric acid, isovaleric acid, valeric acid, caproic acid, lactic acid, succinic acid, benzoic acid, phenylacetic acid, p-toluic acid, and the like are preferred. One or more types of organic carboxylates can be used simultaneously. Sodium or lithium salts of acetic acid, caproic acid, valeric acid, isovaleric acid, 2-ethylbutyric acid, and benzoic acid are preferably used, from the perspective that these materials accelerate the polymerization reaction.

These materials may be used alone or may be used by mixing two or more types as long as the combination can produce the PAS.

The amount of the polymerization auxiliary agent supplied depends on the type of compound, but is typically in the range from 0.01 to 10 mol, preferably from 0.1 to 2 mol, more preferably from 0.2 to 1.8 mol, and particularly preferably from 0.3 to 1.7 mol, per mole of supplied sulfur source.

(Dehydration Step)

In the dehydration step, water is continuously removed from the raw material mixture. Dehydration can be performed in the range from 190° C. to 270° C., preferably from 193° C. to 250° C., and more preferably from 195° C. to 235° C. in a period of time of 50% or longer, preferably 70% or longer, and more preferably 90% or longer of the time to perform the dehydration step. When the temperature in the dehydration step exceeds 270° C., the sulfur source is easily decomposed.

The phrase "time to perform the dehydration step" as used herein refers to a period of time from the moment when the sulfur source and organic polar solvent constituting the raw material mixture are supplied to the moment when the raw material mixture having a reduced water content is extracted from the dehydration apparatus. This time is calculated in consideration of the mass balance.

The dehydration tanks are set in the above-described temperature range, and thus the water in the raw material mixture vaporizes. Thereby, water is removed from the raw material mixture, and the raw material mixture can thus be dehydrated.

The phrase "continuously removing water from the raw material mixture" as used herein means that water continues to be removed from the raw material mixture for a certain period of time.

<Dehydration Auxiliary Agent>

In the continuous dehydration method according to the present embodiment, a dehydration auxiliary agent may be contained in the raw material mixture. The dehydration auxiliary agent may be supplied to the dehydration tank together with the raw materials, or may be supplied in advance in the dehydration tank. Due to the incorporation of the dehydration auxiliary agent in the raw material mixture, dehydration can be accelerated by azeotropy.

The phrase "dehydration auxiliary agent" as used herein refers to an azeotropic agent that accelerates dehydration of the raw material mixture by azeotropy. The dehydration auxiliary agent can be a dehydration auxiliary agent known to those skilled in the art, and examples of the dehydration auxiliary agent include, without limitation, benzene, toluene, xylene, chlorobenzene, and benzene chloride.

An appropriate amount of the dehydration auxiliary agent in the raw material mixture can be used in accordance with the amount of water to be removed and the embodiment of the method.

<Water Content of Raw Material Mixture>

The water content of the raw material mixture before the dehydration step is preferably not less than 3 mol, more preferably not less than 3.5 mol, and even more preferably not less than 4 mol, per mole of the sulfur source, from the perspective of availability and handleability. Note that the water content is the total amount of not only water in the sulfur source or the like or water generated therefrom, but also water contained in other components that may contain water, such as the polymerization auxiliary agent, in a case where such other components are contained in the raw material mixture.

Furthermore, the water content of the raw material mixture having a reduced water content after the dehydration step (hereafter sometimes abbreviated as "dehydrated raw material mixture") is normally from 1.8 to 2 mol or less per mole of the sulfur source. The minimum water content that can suitably be used in the polymerization reaction for PAS is preferably in the range from 0.5 to 1.7 mol, more preferably in the range from 0.6 to 1.5 mol, and even more preferably in the range from 0.7 to 1.4 mol. If the water content of the dehydration raw material mixture exceeds 1.8 mol, the polymerization of PAS will be suppressed.

The water content of the raw material mixture in the dehydration tank to which the raw materials are supplied is higher than that in the other dehydration tank. Hence, the amount of water vaporized from the raw material mixture in the dehydration tank (dehydration tank 1a in FIG. 1) is increased, and the temperature of the dehydration tank is lowered compared to the temperature of the raw material mixture in the downstream dehydration tank (dehydration tank 1b in FIG. 1). Thus, it is possible to efficiently reduce and prevent the occurrence of rapid foaming and overflow in the dehydration tank to which the raw materials are supplied.

(Extraction Step)

In the extraction step, the raw material mixture having a reduced water content is continuously extracted from the continuous dehydration apparatus.

The phrase "continuously extracting the raw material mixture having a reduced water content" as used herein means not that all the raw material mixture having a reduced water content is extracted at one time, but that the raw material mixture having a reduced water content continues to be extracted for a certain period of time.

In the continuous dehydration method according to the present embodiment, the supply step, the dehydration step, and the extraction step are performed concurrently in parallel. That is, while the dehydration step is being performed, the raw materials to be subjected to the dehydration continue to be supplied, and the raw material mixture having a water content reduced by the dehydration is also extracted.

<Dehydration Efficiency Index>

In the continuous dehydration method according to the present embodiment, the dehydration efficiency index determined according to the following Equation (1) is not less than 0.3, preferably not less than 0.6, more preferably not less than 1.0, and even more preferably not less than 1.7. A higher dehydration efficiency index indicates higher dehydration efficiency.

$$\text{Dehydration efficiency index} = [\text{Number of moles (mol) of the sulfur source in the raw material mixture having a reduced water content}]/[\text{Dehydration time (hr)} \times (\text{Total internal volume (L) of the dehydration tanks})^{2/3}] \quad (1)$$

In Equation (1), the dehydration time is a period of time (hr) to dehydrate the raw material mixture until the water content of the raw material mixture before the dehydration step reaches a minimum water content that can be used in the polymerization reaction for PAS. In other words, the dehydration time is a period of time until a moisture content per mole of the sulfur source in the raw material mixture having a reduced water content reaches not greater than 1.7 mol, preferably not greater than 1.5 mol, particularly preferably not greater than 1.05, including moisture consumed by the hydrolysis of the organic polar solvent.

When the continuous dehydration apparatus includes a dehydration chamber containing one or more dehydration tanks as illustrated in FIG. 1, the total internal volume of the dehydration tank(s) in Equation (1) is the total of the internal volumes of the respective dehydration tanks including the gas phase portions, i.e., the internal volume of the dehydration chamber. Also, when the dehydration tanks are each independently present as illustrated in FIG. 2, the total internal volume of the dehydration tank(s) in Equation (1) is the total of the internal volumes of the dehydration tanks.

The fact that the dehydration efficiency index falls within the range described above represents that the raw material mixture can be dehydrated in a short period of time until the water content reaches the minimum water content that can be used in the polymerization reaction for PAS, without increasing the volume of the dehydration tanks. Also, it represents that, when the dehydration tanks have the same volume, a larger amount of raw material mixture can be dehydrated in the same period of time.

(Other Steps)

The continuous dehydration method according to the present embodiment may further include other steps as necessary. Examples of such other steps include a resupply step of recovering the sulfur source volatilized in the dehydration step and resupplying the recovered sulfur source to the continuous dehydration tank. The sulfur source volatilized in the dehydration step is resupplied to the dehydration tank, thereby making it possible to prevent a reduction in the supplied sulfur source, and to prevent harmful sulfur source such as hydrogen sulfide from being discharged to the environment.

In known batch dehydration methods, the sulfur source volatilized in the dehydration step needs to be added to a polymerization reaction tank in order that it is recovered and used. Therefore, the stoichiometric balance between a dihalo aromatic compound and the sulfur source is lost, and the degree of polymerization of PAS often fluctuates. On the other hand, in the present embodiment, the dehydration step and the supply step are performed concurrently in parallel, and thus the sulfur source volatilized in the dehydration step can be supplied to the dehydration tank. As a result, the degree of polymerization of PAS hardly fluctuates.

In known batch dehydration methods, when raw materials are attempted to be supplied in the temperature range described above, bumping or rapid foaming is likely to occur. In addition, the foaming may cause overflow to the dehydration column. Therefore, in known batch dehydration methods, it is necessary to set the temperature for supplying the raw materials to a low temperature and to gradually increase the temperature and perform dehydration. On the other hand, in the continuous dehydration method of the present embodiment, it is not necessary to gradually increase the temperature and perform dehydration, and, even when dehydration is performed at a high temperature from the time of supplying the raw materials to the continuous dehydration apparatus, the effect that overflow due to bumping and rapid foaming hardly occurs is obtained.

[Method of Producing Polyarylene Sulfide]

In the method for producing polyarylene sulfide of the present embodiment, polymerization is performed using a raw material mixture having a reduced water content obtained by the continuous dehydration method described above. The polymerization is not particularly limited as long as it is performed by a known method, and can be performed by a publicly known method such as a continuous or batch method.

PAS can be produced by mixing the dehydrated raw material mixture and the dihalo aromatic compound in a reaction tank and performing a polymerization reaction between the sulfur source and the dihalo aromatic compound in the organic polar solvent.

Examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. A halogen atom is each an atom of fluorine, chlorine, bromine, and iodine, and the two halogen atoms in the dihalo aromatic compound may be the same or different. Particularly, p-dichlorobenzene is preferably used.

To produce a branched or crosslinked polymer, a polyhalo compound (not necessarily an aromatic compound) in which three or more halogen atoms are bonded, an active hydrogen-containing halogenated aromatic compound, a halogenated aromatic nitro compound, or the like may be used together. Preferable examples of the polyhalo compound as a branching/crosslinking agent include trihalobenzene.

<Polyarylene Sulfide>

The PAS obtained by the production method of the present embodiment is a linear or branched PAS, and is preferably polyphenylene sulfide (PPS).

The weight average molecular weight (Mw) of the PAS is not particularly limited and extends broadly. Typically, the lower limit value of the weight average molecular weight of PAS calibrated with standard polystyrene according to gel permeation chromatography (GPC) is not less than 2000, preferably not less than 10000, and more preferably not less than 15000. Furthermore, the upper limit value of the weight average molecular weight is not greater than 300000, and preferably not greater than 100000.

Summary

The continuous dehydration method for a raw material mixture to be used in the production of polyarylene sulfide according to the present embodiment is carried out prior to the production of polyarylene sulfide, and includes:

a supply step of continuously supplying a sulfur source and an organic polar solvent that constitute the raw material mixture to a continuous dehydration apparatus having one or more dehydration tanks;

a dehydration step of continuously removing water from the raw material mixture; and an extraction step of continuously extracting the raw material mixture having a reduced water content from the dehydration tanks, the steps being carried out concurrently in parallel.

The temperature of the dehydration tank supplied with the sulfur source and the organic polar solvent in the dehydration tanks ranges from 110° C. to 270° C., and the dehydration efficiency index determined according to the following Equation (1) is not less than 0.3:

Dehydration efficiency index=[Number of moles (mol) of the sulfur source in the raw material mixture having a reduced water content]/[Dehydration time (hr)×(Total internal volume (L) of the dehydration tanks)$^{2/3}$]    (1)

where the dehydration time is a period of time until a moisture content per mole of the sulfur source in the raw material mixture having a reduced water content reaches not greater than 1.7 mol, including moisture consumed by the hydrolysis of the organic polar solvent.

In the continuous dehydration method according to the present embodiment, it is preferable that the dehydration tank includes a plurality of the dehydration tanks that communicate with each other via a gas phase, that the dehydration tanks are sequentially connected, and that the raw material mixture sequentially moves to the respective dehydration tanks.

Preferably, a polymerization auxiliary agent for polyarylene sulfide is further supplied in the supply step.

In the continuous dehydration method according to the present embodiment, a dehydration auxiliary agent is preferably contained in the raw material mixture.

In the continuous dehydration method according to the present embodiment, the sulfur source is preferably at least one of alkali metal sulfides, alkali metal hydrosulfides, and hydrogen sulfides.

In the continuous dehydration method according to the present embodiment, it is preferable that the water content of the raw material mixture before the dehydration step is not less than 3 mol per mole of the sulfur source, and that the water content of the raw material mixture having a reduced water content after the dehydration step is in the range from 0.5 to 1.7 mol per mole of the sulfur source.

Water is preferably removed at a temperature in the range from 190° C. to 270° C. in a period of time of not less than 50% of a time to perform the dehydration step.

Preferably, the continuous dehydration method according to the present embodiment further includes a resupply step of recovering the sulfur source volatilized in the dehydration step and resupplying the recovered sulfur source to the dehydration tank.

In the continuous dehydration method according to the present embodiment, the dehydration tanks are preferably made of stainless steel.

Also, in the method for producing polyarylene sulfide according to the present embodiment, polymerization is performed using a raw material mixture having a reduced water content obtained by the continuous dehydration method described above.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

[Example 1] Dehydration of Raw Material Mixture by Continuous Method in Cylindrical Dehydration Apparatus Made of Titanium A continuous dehydration apparatus as illustrated in FIG. 1 was used in which a dehydration chamber 2 had two dehydration tanks partitioned by a single partition wall (height: approximately 10 cm). The dehydration tanks constituted a titanium (Ti)-made cylindrical dehydration apparatus (total internal volume: about 20 L) having a diameter of approximately 28 cm and a length of approximately 32 cm. The dehydration tank 1a was charged with 7.0 kg of NMP. Then, the temperature of the dehydration tank 1a was held at 220° C., and the temperature of the dehydration tank 1b was held at 240° C. NMP and 47.4 wt % of an aqueous solution of sodium hydrosulfide (NaSH) were continuously supplied, as raw materials, from each supply line using a metering pump at flow rates of 4.07 kg/hr and 2.39 kg/hr, respectively (water content of the raw material mixture supplied was 6.2 mol per mole of the sulfur source). Water and NMP were continuously removed from the dehydration chamber 2 while the pressure was controlled to a gauge pressure of 0.32 MPa by a pressure adjusting valve.

At the same time, NMP was separated using a first gas-liquid separation unit 13 connected to the dehydration chamber 2, and supplied to the dehydration tank 1a via an organic polar solvent supply line 14.

The gas recovered from the first gas-liquid separation unit 13 was fed to a second gas-liquid separation unit 17 through a first gas recovery line 15, and separated into water and gas. Water was discarded through a waste water line 16.

The gas recovered from the second gas-liquid separation unit 17 was fed to a sulfur source recovery unit 19 through a second gas recovery line 18.

The gas was absorbed by NMP supplied from a sulfur source absorbent supply line 21 to the sulfur source recovery unit 19 at 2.00 kg/hr and 47.94 wt % NaOH at 1.69 kg/hr. At this time, the total amount of the NMP and aqueous NaOH solution that absorbed the gas was resupplied to the dehydration tank 1a via a sulfur source resupply line 20. Taking into account the amounts of the NMP and aqueous NaOH solution that absorbed the gas, the water content of the raw materials supplied to the dehydration tank 1a was 6.8 mol per mole of the sulfur source.

The raw material mixture after the dehydration was continuously extracted through a raw material mixture extraction line 4. The water content of the raw material mixture having a water content reduced by the dehydration was 1.01 mol per mole of the sulfur source.

After the operation of the continuous dehydration apparatus was stabilized, a dehydrated mixture containing 14.4 mol (number of moles) of the sulfur source in the raw material mixture having a reduced water content was recovered in 1 hour. No foaming or overflow was observed during the dehydration, and the dehydration efficiency index was 2.0.

Furthermore, the extent of corrosion in the dehydration tanks after the dehydration, when evaluated based on the following criteria, was ranked as AA.

<Corrosion Evaluation Criteria>

AA: The extent of corrosion in the dehydration tanks was relatively lowest, and the dehydration tanks were well resistant to corrosion.
A: The extent of corrosion in the dehydration tanks was relatively low, and the dehydration tanks were resistant to corrosion.
C: The extent of corrosion in the dehydration tanks was relatively high, and the dehydration tanks were scarcely resistant to corrosion.

[Example 2] Production of PAS

The sulfur source (in an amount corresponding to a number of moles of 3.0 mol) in the dehydrated raw material mixture obtained in Example 1 and 3.09 mol of p-dichlorobenzene were charged in a Ti-made reaction apparatus (total internal volume: approximately 3 L) in a nitrogen atmosphere.

After they were reacted at 230° C. for 3 hours, 10.5 mol of water was pressed into the reaction product, and then they were reacted at 260° C. for 3 hours. The obtained reaction mixture was sieved with a 100-mesh sieve, and granular PPS was recovered.

Furthermore, the granular PPS was washed three times with acetone having the same weight as that of the obtained reaction mixture, and sieved. Furthermore, the obtained granular PPS was washed with water three times and sieved, and the obtained granular PPS was dried for 8 hours at 80° C. under vacuum to obtain PPS particles. The weight average molecular weight Mw of the PPS particles calibrated with standard polystyrene according to GPC was 32,000.

[Comparative Example 1] Dehydration by Batch Method in Autoclave Made of Titanium Into 20 L of an autoclave made of titanium, 6001 g of NMP, 2000 g of an aqueous NaSH solution (purity: 61.8 mass %), and 1171 g of an aqueous NaOH solution (purity: 73.7 mass %) were charged. As the dehydration step, after the inside of the autoclave was purged with nitrogen gas, the temperature was gradually increased from an ordinary temperature to 200° C. over approximately 3 hours, and 1014 g of water, 763 g of NMP, and 5.5 g of hydrogen sulfide ($H_2S$) were distilled away. No overflow was observed during the dehydration step. The residual moisture content per mole of the sulfur source was 1.14 mol, including moisture consumed by the hydrolysis of the organic polar solvent NMP. Note that in the case of a batch method, a loss time associated with multiple times of polymerization (approximately, 1 hour for charging, 2 hours for cooling, 1 hour for removal, and 1 hour for autoclave cleaning) occurred. The loss time was added to the dehydration time for calculation, and then the dehydration efficiency index determined according to Equation (1) above was calculated as 0.4.

[Comparative Example 2] Rapid Dehydration by Batch Method in Autoclave Made of Titanium The steps were performed in the same manner as in Comparative Example 1 except that dehydration was performed while the temperature was rapidly increased so that the residual moisture content per mole of the sulfur source reached not greater than 1.7 mol in a dehydration time of 1 hour, including moisture consumed by the hydrolysis of the organic polar solvent NMP. The dehydrated raw material mixture is overflowed from the dehydration apparatus, and the dehydration operation could not be continued.

[Example 3] Dehydration of Raw Material Mixture by Continuous Method in Cylindrical Dehydration Apparatus Made of SUS316

The raw material mixture was dehydrated by a continuous method in the same manner as in Example 1 except that the material for the dehydration tanks of the cylindrical dehydration apparatus was SUS316. All the steps were performed in the same manner as in Example 1. For example, no foaming or overflow was observed during the dehydration, and the dehydration efficiency index was 2.0.

Furthermore, the extent of corrosion in the dehydration tanks after the dehydration, when evaluated based on the criteria of Example 1, was ranked as AA.

[Example 4] Production of PAS

PAS was produced in the same manner as in Example 2 using the dehydrated raw material mixture obtained in Example 3. Granular PPS equivalent to that of Example 2 was obtained.

[Comparative Example 3] Dehydration by Batch Method in Autoclave Made of SUS316

The raw material mixture was dehydrated by a batch method in the same manner as in Comparative Example 2 except that the material for the autoclave was SUS316. The extent of corrosion in the dehydration tanks after the dehydration, when evaluated based on the criteria of Example 1, was ranked as C.

Summary of Examples

From the Examples and the Comparative Examples described above, the following facts are clear.

The configuration of an embodiment of the present invention can reduce or prevent rapid foaming and liquid overflow, and thus the dehydration efficiency of the raw material mixture used in the production of PAS was improved. Therefore, the raw material mixture could be dehydrated in a short period of time until the water content reaches the minimum water content that can be used in the polymerization reaction of PAS, without increasing the volume of the dehydration tanks.

Furthermore, high molecular weight PAS could easily be produced from the raw material mixture having a reduced water content.

Further, the temperature of the dehydration tanks to which the raw material mixture containing water was supplied was increased to a high temperature, and thus the extent of corrosion of the dehydration tanks using SUS316, which is stainless steel, could be suppressed to the same level as in the case of dehydration tanks using titanium. Titanium is a material commonly used in the production of PAS and is more difficult to be processed and more expensive than stainless steel. The present invention makes it possible to change the material for the dehydration tanks from titanium to stainless steel while suppressing the corrosion of the dehydration tanks to an equivalent level, thereby achieving resource saving and cost reduction.

REFERENCE SIGNS LIST 1a to 1d Dehydration tank
2 Dehydration chamber
3 Raw material supply line
4 Raw material mixture extraction line
5 Partition wall
6a, 6b Raw material mixture
7a, 7b Stirring blade
8 Stirring shaft
9 Rotary driving device
10 Gas phase communication portion
11 Raw material mixture communication portion
12 Exhaust line
13 First gas-liquid separation unit
14 Organic polar solvent resupply line
15 First gas recovery line
16 Waste water line
17 Second gas-liquid separation unit
18 Second gas recovery line
19 Sulfur source recovery unit
20 Sulfur source resupply line
21 Sulfur source absorbent supply line
22 Waste gas line
100, 200 Continuous dehydration apparatus

The invention claimed is:

1. A continuous dehydration method for a raw material mixture to be used in the production of polyarylene sulfide, which is carried out prior to the production of polyarylene sulfide, the method comprising:
  a supply step of continuously supplying a sulfur source and an organic polar solvent that constitute the raw material mixture to a continuous dehydration apparatus having one or more dehydration tanks;
  a dehydration step of continuously removing water from the raw material mixture; and
  an extraction step of continuously extracting the raw material mixture having a reduced water content from the continuous dehydration apparatus,
  the steps being carried out concurrently in parallel,
  wherein a temperature of the dehydration tank supplied with the sulfur source and the organic polar solvent in the continuous dehydration apparatus ranges from 110° C. to 270° C., and
  a dehydration efficiency index determined according to the following Equation (1) is not less than 0.3:

dehydration efficiency index=[Number of moles (mol) of the sulfur source in the raw material mixture having a reduced water content]/[Dehydration time (hr)×(Total internal volume (L) of the dehydration tanks)$^{2/3}$] (1)

where the dehydration time is a period of time until a moisture content per mole of the sulfur source in the raw material mixture having a reduced water content reaches not greater than 1.7 mol, including moisture consumed by the hydrolysis of the organic polar solvent.

2. The continuous dehydration method according to claim 1, wherein the continuous dehydration apparatus includes a plurality of the dehydration tanks that are sequentially connected,
  the raw material mixture sequentially moves from one of the dehydration tanks to another of the dehydration tanks, and
  the dehydration tanks communicate with each other via a gas phase such that pressure of the gas phase in the dehydration tanks is uniform.

3. The continuous dehydration method according to claim 1, wherein a polymerization auxiliary agent for polyarylene sulfide is further supplied in the supply step.

4. The continuous dehydration method according to claim 1, wherein a dehydration auxiliary agent is included in the raw material mixture.

5. The continuous dehydration method according to claim 1, wherein the sulfur source is at least one of alkali metal sulfides, alkali metal hydrosulfides, and hydrogen sulfide.

6. The continuous dehydration method according to claim 1, wherein the water content of the raw material mixture before the dehydration step is not less than 3 mol per mole of the sulfur source, and the water content of the raw material mixture having a reduced water content after the dehydration step ranges from 0.5 to 1.7 mol per mole of the sulfur source.

7. The continuous dehydration method according to claim 1, wherein water is removed at a temperature in the range from 190° C. to 270° C. in a period of time of not less than 50% of a time to perform the dehydration step.

8. The continuous dehydration method according to claim 1, further comprising a resupply step of recovering the sulfur source volatilized in the dehydration step and resupplying the recovered sulfur source to the continuous dehydration apparatus.

9. The continuous dehydration method according to claim 1, wherein the dehydration tank is made of stainless steel.

10. A method for producing polyarylene sulfide, comprising:
  a supply step of continuously supplying a sulfur source and an organic polar solvent that constitute the raw material mixture to a continuous dehydration apparatus having one or more dehydration tanks;
  a dehydration step of continuously removing water from the raw material mixture; and
  an extraction step of continuously extracting the raw material mixture having a reduced water content from the continuous dehydration apparatus,
  the steps being carried out concurrently in parallel,
  wherein a temperature of the dehydration tank supplied with the sulfur source and the organic polar solvent in the continuous dehydration apparatus ranges from 110° C. to 270° C., and
  a dehydration efficiency index determined according to the following Equation (1) is not less than 0.3:

dehydration efficiency index=[Number of moles (mol) of the sulfur source in the raw material mixture having a reduced water content]/[Dehydration time (hr)×(Total internal volume (L) of the dehydration tanks)$^{2/3}$]  (1)

where the dehydration time is a period of time until a moisture content per mole of the sulfur source in the raw material mixture having a reduced water content reaches not greater than 1.7 mol, including moisture consumed by the hydrolysis of the organic polar solvent, and further comprising a polymerization step of polymerizing the raw material mixture having a reduced water content so as to produce polyarylene sulfide.

* * * * *